United States Patent [19]

Asselman et al.

[11] 4,291,676

[45] Sep. 29, 1981

[54] SOLAR COLLECTOR, COMPRISING AN EVAPORATION/CONDENSATION SYSTEM

[75] Inventors: George A. A. Asselman; Adrianus J. Van Mensvoort, both of Eindhoven, Netherlands

[73] Assignee: U.S. Philips Corporation, New York, N.Y.

[21] Appl. No.: 48,416

[22] Filed: Jun. 14, 1979

[30] Foreign Application Priority Data

Jun. 30, 1978 [NL] Netherlands .................. 7807174

[51] Int. Cl.³ .................. F24J 3/02; F28D 15/00
[52] U.S. Cl. .................. 126/433; 126/446; 165/104.21
[58] Field of Search .............. 126/433, 449, 901, 442, 126/417, 446; 165/105

[56] References Cited

U.S. PATENT DOCUMENTS

| | | | |
|---|---|---|---|
| 3,677,329 | 7/1972 | Kirkpatrick | 165/105 |
| 3,875,926 | 4/1975 | Frank | 126/433 |
| 3,952,798 | 4/1976 | Jacobson et al. | 165/105 |
| 4,027,653 | 6/1977 | Meckler | 126/433 |
| 4,057,963 | 11/1977 | Basiulis | 126/433 |
| 4,058,160 | 11/1977 | Corman et al. | 165/105 |
| 4,067,315 | 1/1978 | Fehlner et al. | 126/433 |
| 4,091,264 | 5/1978 | Sarcia | 165/105 |
| 4,119,085 | 10/1978 | Knowles et al. | 126/433 |
| 4,127,105 | 11/1978 | Watt | 126/433 |

*Primary Examiner*—Daniel J. O'Connor
*Attorney, Agent, or Firm*—Thomas A. Briody; William J. Streeter; Rolf E. Schneider

[57] ABSTRACT

A solar collector comprises a tube containing an evaporable heat transport medium and having an evaporation zone and a condensation zone arranged during operation at a level higher than that of the evaporation zone. A plurality of pieces of a liquid-absorbing material is provided in the evaporation zone in a row extending in the axial direction of the tube in order to accumulate returning condensate, adjacent pieces being spaced from each other. These pieces are mounted on a shaft that maintains the same in contact with the inner surface of the tube.

1 Claim, 3 Drawing Figures

SOLAR COLLECTOR, COMPRISING AN EVAPORATION/CONDENSATION SYSTEM

This invention relates to a solar collector, comprising a sealed tube which contains a quantity of an evaporable heat transport medium and which comprises an evaporation zone which receives solar energy during operation and a condensation zone which is arranged during operation at a level higher than that of the evaporation zone, the evaporation zone comprising a number of liquid-accumulating elements which are distributed over its longitudinal dimension and which are situated at a distance from each other, said elements accumulating condensed heat transport medium which returns to the evaporation zone under the influence of gravity during operation.

A solar collector of this type is described in application Ser. No. 5,735 filed Jan. 23,1979, now U.S. Pat. No. 4,270,520.

The tube of this prior solar collector is made of metal and the liquid-accumulating elements are formed by protrusions in the tube wall.

Because the protrusions receive condensate, evaporation takes place over the entire evaporation zone instead of only at the lower collecting part of the tube when the solar collector is put into operation. The starting time required before the solar collector acts as a supplier of heat is then short, and failure of the evaporation/condensation process to start when the lower part of the evaporation zone of the solar collector arranged in the outside air is covered by snow or situated in the shade, is also prevented.

A drawback of such solar collector consists in that it is difficult to provide the protrusions in the metal tube.

The present invention has for its object to provide a solar collector of the described kind which is simpler in construction and which is less expensive.

In order to realize this object, the solar collector in accordance with the invention is characterized in that the liquid-accumulating elements consist of pieces of a liquid-absorbing material which are arranged inside the tube.

In a preferred embodiment of the solar collector in accordance with the invention, the pieces of liquid-absorbing material are threaded on a pin.

The threading of the pieces of liquid-absorbing material on the pin can be simply effected prior to the mounting of the assembly in the tube.

In accordance with the invention, the pin with the pieces of liquid-absorbing material can be arranged inside the tube to be freely rotatable around the tube axis with respect to the tube.

This offers the advantage that, regardless of rotation of the solar collector around the tube axis or around an axis parallel thereto, the pieces of liquid-absorbing material always contact, as a result of gravity, the tube wall at the areas where the condensate flows. This offers a high degree of freedom as regards the arrangement of the solar collector.

The invention will now be described in detail with reference to the accompanying drawings in which.

Figure 1:
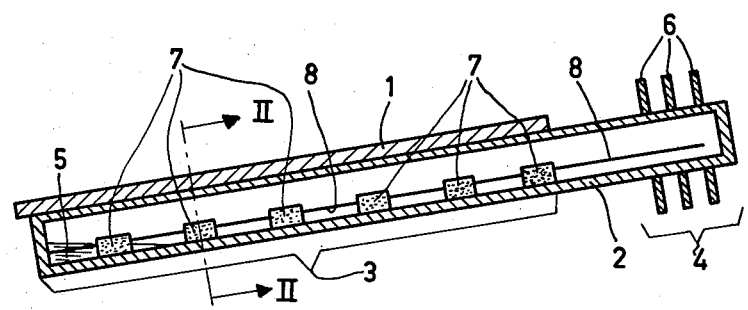
FIG. 1 is a longitudinal sectional view of a solar collector, comprising an absorber plate and an evaporation/condensation tube.
Figure 2:
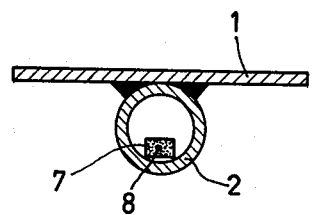
FIG. 2 is a sectional view, taken along the line II—II of FIG. 1.
Figure 3:
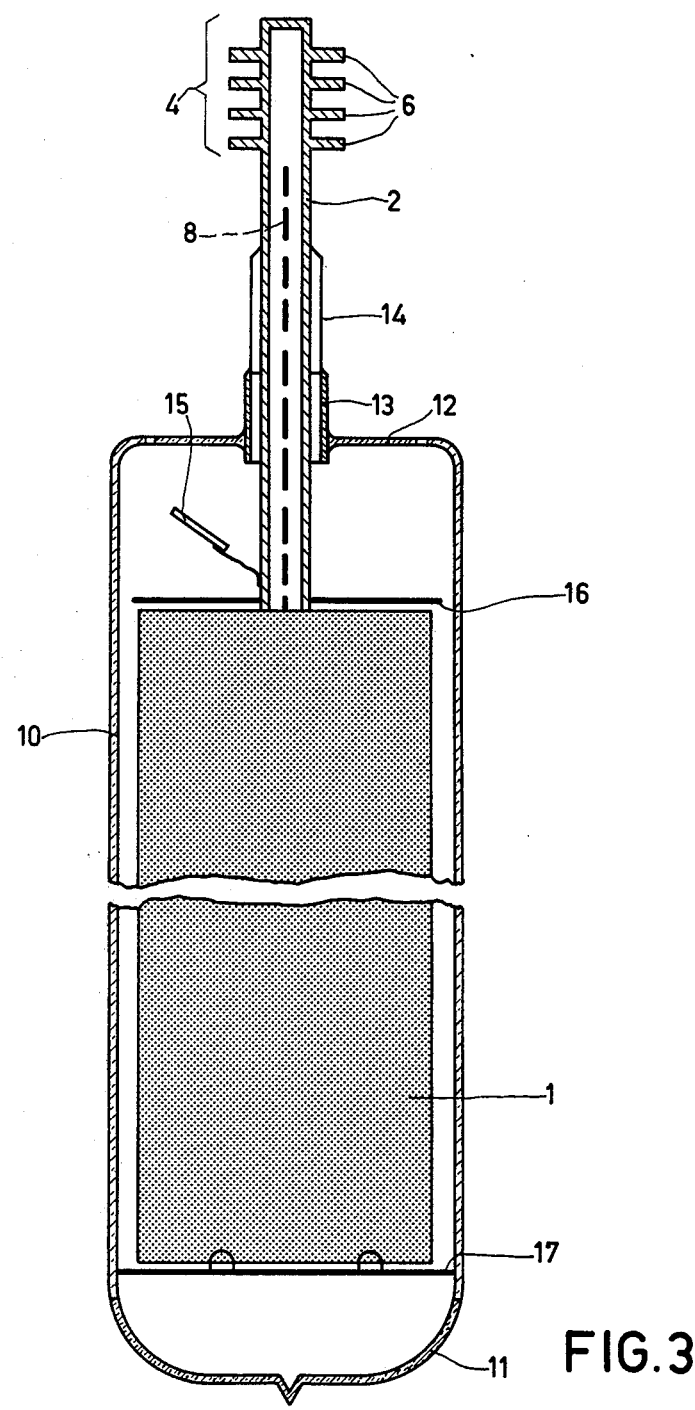
FIG. 3 is a longitudinal sectional view on an enlarged scale of the solar collector of FIG. 1 which is accommodated, except for the condensation zone, in an evacuated transparent envelope.

The solar collector shown in FIGS. 1 to 3 comprises a flat metal absorber 1 which consists of, for example, an aluminium plate whose upper side is provided with a nickel oxide or a copper oxide layer or a nickel sulphide or a copper sulphide layer. The absorber 1 has connected to it, for example, by soldering or welding, a sealed metal tube 2 which acts as an evaporator 3 at the area of the absorber 1 and, by way of its part which projects above the absorber 1, as a condensor 4 for a heat transport medium 5, for example, a hydrocarbon, present in the tube 2.

In the condensation zone 4, the tube is provided with a number of fins 6 which are flushed by a heat transfer medium, for example, water in a heating system (not shown) which cooperates with the solar collector.

During operation, the solar collector is arranged so that the condensor 4 is situated at a higher level than the evaporator 3, so that the liquid heat transport medium 5 normally accumulates at the bottom of the evaporator 3. When the absorber 1, and hence the evaporation zone 3 of the tube 2, are heated by solar radiation, the heat transport medium evaporates, flows to the condensation zone 4, and condenses at this area while giving off heat.

Under the influence of gravity, the condensate returns to the evaporation zone 3 along the inner wall of the tube 2.

Inside the evaporation zone 3, a number of pieces 7 of a liquid absorbing material are arranged at a uniform distance from each other in the longitudinal direction of the tube 2. The pieces of liquid absorbing material 7 may consist of, for example, blocks of a ceramic material such as pumice, fabrics of metal wires, glass fibres or fibres of a synthetic material having liquid absorbing pores.

The pieces of material 7 are arranged on a pin or shaft 8.

When condensate flows from the condensor 4 to the evaporator 3 during operation, the pieces of material absorb or retain part of the condensate, whilst the remainder accumulates at the bottom of the tube 2.

When the solar collector is put into operation again, liquid not only evaporates at the lower end of the tube 2, but also from the pieces of material 7. Therefore, evaporation occurs throughout the evaporation zone, so that a large quantity of vapour becomes available for heat transport within a short period of time.

The assembly formed by the pin 8 and the pieces of material 7 can freely rotate around the tube axis along the inner wall of the tube 2, so that regardless of the position of the solar collector, the pieces of material 7 always contact the lowest part of the tube wall in the flow path of the condensate as a result of gravity.

FIG. 3 shows the solar collector of FIG. 1 of which the plate-shaped absorber 1 and the evaporation zone 3 of the pipe 2 are accommodated in a glass cover tube 10.

The cover tube 10 has a round cross-section and is sealed at its end face 11. The end face 12 is made of leaded glass and is connected in a vacuum-tight manner to a cylindrical metal sleeve 13 which is arranged around the tube 2 and which is made of, for example, copper or a nickel iron alloy. The metal sleeve 13 changes over into a thin-walled metal sleeve 14, for example, made of brass or high-grade steel, which is connected to the tube 2 in a vacuum-tight manner. As a result of this construction, thermal stresses between the metal tube 2 and the glass cover tube 10 are avoided. The cover tube 10 is evacuated to a residual gas pressure of less than 1 mbar. In order to improve the vacuum, a getter 15 is provided in the cover tube 10.

At the ends of the plate-shaped absorber 1 there are provided reflectors 16 and 17 which extend transversely of the axis of the tube 2 and which may consist of mica on which a layer of aluminium is provided by vapour deposition. The reflector 17 also serves for keeping the absorber 1 in position in the cover tube 10. The arrangement of the solar collector in the evacuated cover tube 10 reduces the heat losses. For further improvement, the inner side of the cover tube 10 may be completely or partly provided with a selective heat-reflective layer which may consist of, for example, zinc-doped indium oxide (not shown).

Obviously, the tube 2 may consist of a non-metal, for example glass, and the absorber plate may be omitted.

Several of these solar collectors can be adjacently arranged and connected to a heat exchange duct wherethrough a heat transport medium of a heating system flows, the condensors 4 then projecting into the duct by way of the fins 6. A solar collector installation having a very large collecting surface is thus realized.

What is claimed is:

1. A solar collector, which comprises a sealed tube having an evaporation zone receiving solar energy during operation and a condensation zone arranged during operation at a level higher than that of the evaporation zone; an evaporable heat transport medium contained in said tube, said heat transport medium during operation being evaporated in the evaporation zone and being condensed in the condensation zone, the resulting condensate returning to the lower end of the evaporation zone under the influence of gravity; a plurality of pieces of a liquid-absorbing material arranged within the evaporation zone of the tube in contact with the inner surface thereof and extending in a row longitudinally of said tube, adjacent liquid-absorbing material pieces being spaced from each other, said spaced liquid-absorbing material pieces each respectively retaining a portion of the returning condensate and thereby interrupting the return of all the condensate to the lower end of the evaporation zone whereby, upon start of operation, evaporation of the heat transport medium occurs also along the length of the evaporation zone rather than solely at the lower end of said evaporation zone; and a shaft for mounting said pieces to maintain the same in contact with the inner surface of the evaporation zone of the tube in which the shaft is freely rotatable about the tube axis.

* * * * *